Patented Jan. 31, 1928.

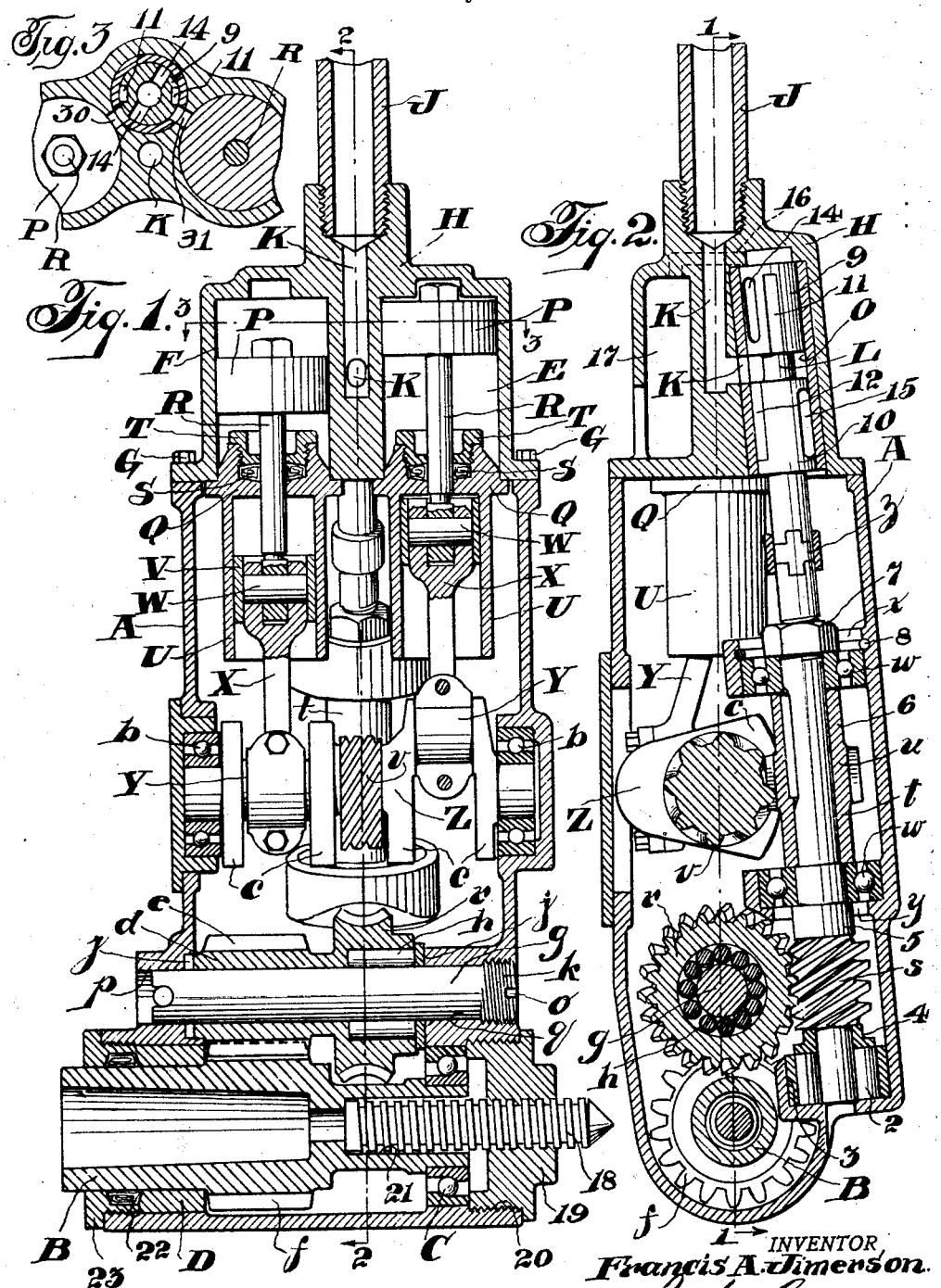

1,657,930

UNITED STATES PATENT OFFICE.

FRANCIS A. JIMERSON, OF ATHENS, PENNSYLVANIA, ASSIGNOR TO INGERSOLL-RAND COMPANY, OF JERSEY CITY, NEW JERSEY, A CORPORATION OF NEW JERSEY.

CLOSE-QUARTER DRILL.

Application filed May 17, 1926. Serial No. 109,513.

This invention relates to drilling machines, but more particularly to a type of rotary drill adapted for use in close quarters.

One object of the invention is to simplify the reduction gearing between the drill motor and the spindle. Other objects are to reduce the number of parts required to drive the drill spindle, and to make such parts easily accessible and removable for repair. Other objects of the invention will be in part obvious and in part pointed out hereinafter.

In the drawing forming part of the specification and in which similar reference characters refer to similar parts, Figure 1 is a longitudinal section taken along the line 1—1 looking in the direction of the arrows, of a close quarter drill constructed in accordance with the practice of the invention, Figure 2 is a longitudinal section taken along the line 2—2 looking in the direction of the arrows and Figure 3 is a cross section taken along the line 3—3 of Figure 1 looking in the direction of the arrows.

Referring to the drawings, the close quarter drill comprises a casing A preferably long and narrow within which a spindle B of a suitable form is transversely journaled as by means of anti-friction bearings C and a sleeve bearing D at one end of the casing. At the other end of the casing there is provided a pair of cylinders E and F preferably formed in a unit which is adapted to be attached by means of suitable bolts G to the casing.

The cylinder portion H in which the cylinders E and F are formed is preferably provided with a tubular handle J through which motive fluid is supplied to an air passage K leading to a rotary valve L operating in a suitable bore O formed in the cylinder casting H. Each of the cylinders E and F is provided with a piston P which is preferably double acting there being provided a cylinder head and cross head guide Q cooperating with piston rods R suitably bolted to the pistons P. Leakage air of the piston rods R is prevented by suitable packing S held in place by means of glands T.

The cylinder heads Q are provided with tubular extensions U acting as guides for cylindrical cross heads V attached to the outer ends of the piston rods R and also by means of pins W to connecting rods X. The opposite ends of the connecting rods X are journaled on crank pins Y of a transversely disposed crank shaft Z journaled in the sides of the casing by means of suitable anti-friction bearings $b$. In order to eliminate some of the vibration the crank shaft Z is provided with suitable counterweights $c$.

In order that the casing A be as small as possible about the spindle B a counter shaft $d$ is provided geared to the spindle B by means of gear teeth $e$ formed integrally with the counter shaft $d$ and gear teeth $f$ preferably formed integrally with the spindle B. The counter shaft $d$ is supported in the casing so as to be easily removable by means of a stationary shaft $g$ upon which the counter shaft $d$ is adapted to rotate, there being provided at one end of the counter shaft, anti-friction roller bearings $h$. Plain thrust bearings $j$ are preferably provided at opposite ends of the counter shaft $d$ which are replaceable when worn. The stationary shaft $g$ has an enlarged threaded head $k$ at one end and a slot $o$ by means of which the shaft may be screwed into place in aligned bores $p$ and $q$ in the casing A.

Upon the counter shaft $d$ and preferably formed integrally therewith there is provided a worm wheel $r$ which is adapted to be engaged by a worm $s$ of a longitudinally disposed shaft $t$ which is also provided with a spiral gear $u$ meshing with a spiral gear $v$ formed on the crank shaft Z preferably at the center of the crank shaft. The longitudinal shaft $t$ is journaled preferably in anti-friction bearings $w$ supported by webs $x$ and $y$ of the casing A and is preferably in alignment with the rotating valve L being coupled thereto by means of a jaw coupling member $z$.

At the end of the longitudinal shaft $t$ adjacent the worm $s$ there is provided an anti-friction bearing 2 preferably of the roller type mounted in an aperture 3 formed in the casing A. Between the roller bearing 2 and the adjacent anti-friction bearing *w* there are provided on opposite sides of the worm *s* a pair of collars 4 and 5 maintaining the bearings 2 and *w* at the proper distance. The spiral gear *u* is provided with a sleeve-like-hub 6 of a length adapted to space the two bearings *w*. A nut 7 on the shaft *t* holds the bearing *w* and gear *u* in position. A spring retainer 8 may also be provided to hold the bearing *w* in position in the web *x*.

The valve L may be of any suitable rotary type as disclosed. In this instance the valve is provided with two heads 9 and 10 which are adapted to supply motive fluid to the opposite ends of the cylinders E and F. Motive fluid is admitted through the air passage K to the bore of the valve chamber O and thence through longitudinal grooves 11 and 12 in the heads 9 and 10 respectively to admission and exhaust ports 30 and 31 leading to the cylinders E and F respectively.

In the form of valve illustrated, the exhaust is educted from the cylinders through ports 14 and 15 in the heads 9 and 10 of the valve L whence the exhaust finds its way to atmosphere through a passage 16 and a chamber 17 connected therewith to atmosphere.

As is usual in double acting motors of this type the cranks Y are set at 90 degrees with respect to each other and the ports 30 and 31 are likewise set at 90 degrees with respect to the valve so that the ports 11 and 14 may be used for admission and exhaust respectively for both cylinders E and F. The valve is geared to rotate at one half the crank shaft speed and accordingly there are two sets of ports 11 and 14, and 12 and 15, allowing the valve to be balanced with respect to the pressures of motive fluid and exhaust. The lower ends of cylinders E and F are also provided with ports similar to ports 31 and 30 and their co-action with inlet port 12 and exhaust port 15 is similar to that above described, but 180° out of phase therewith, as is obvious. The arrangement of valve ports 11 and 14 and the corresponding ports 12 and 15 is such that admission of motive fluid occurs at dead center and provides a very slight expansion after cutoff and a relatively early exhaust since the motor is intended to operate at high speed. It is understood that details of the valve construction may be varied to suit existing conditions without departing from the spirit of the invention.

The drill may be provided with a feed screw 18 in alignment with the spindle B and threaded into a cap 19 suitably mounted in an aperture 20 of the casing A. The cap 19 may be adapted to hold the anti-friction bearing *c* in position. Preferably, the spindle B is bored as at 21 to permit the feed screw 18 to extend into the spindle and thus provide compactness and great length of feed.

It is desirable that a drill of this type be partly filled with a suitable grease for lubricating the gears and bearings, and in order that such grease shall not leak from the casing A the spindle B is packed by means of packing material 22 compressed by a suitable gland 23 about the end of the spindle B, the gland 23 being preferably screw threaded into the aperture in the casing A about the spindle.

Thus by the above construction are accomplished among others the objects hereinbefore referred to.

I claim—

1. A close quarter drill comprising a casing, a spindle transversely journaled at one end of the casing, a pair of longitudinally arranged motor cylinders at the opposite end of the casing, a crank shaft transversely arranged in the casing, pistons and connecting rods cooperating with the cylinders to drive the crank shaft, and a shaft longitudinally arranged in the casing and geared to the crank shaft and spindle.

2. A close quarter drill comprising a casing, a spindle transversely journaled at one end of the casing, a pair of longitudinally arranged motor cylinders at the opposite end of the casing, a crank shaft transversely disposed in said casing, pistons and connecting rods co-operating with the cylinders to drive the crank shaft, a countershaft adjacent the spindle and geared thereto, and a shaft extending longitudinally in the casing geared to the crank shaft and said countershaft for driving the spindle.

3. A close quarter drill comprising a casing, a spindle transversely journaled at one end of the casing, a pair of longitudinally arranged motor cylinders at the opposite end of the casing, a crank shaft transversely arranged in said casing, pistons and connecting rods cooperating with the cylinders to drive the crank shaft, a shaft arranged longitudinally in the casing and geared to said crank shaft and spindle, and a valve for distributing motive fluid to the motor cylinders coupled to said longitudinal shaft.

4. A close quarter drill comprising a casing, a spindle transversely journaled at one end of the casing, a pair of longitudinally arranged motor cylinders at the opposite end of the casing, a transverse crank shaft, pistons and connecting rods cooperating with the cylinders to drive the crank shaft, a countershaft geared to said spindle and having a worm wheel, a longitudinally disposed shaft having a worm meshing with said worm wheel, and spiral gears on said crank shaft and said longitudinal shaft.

5. A close quarter drill comprising a casing, a spindle transversely journaled at one end of the casing, a pair of longitudinally arranged motor cylinders at the opposite end of the casing, a crank shaft transversely arranged in the casing, pistons and connecting rods cooperating with the cylinders to drive the crank shaft, a countershaft geared to the spindle and provided with a worm wheel, a longitudinally disposed shaft having a worm engaging said worm wheel and geared to the crank shaft, and a rotary valve for distributing motive fluid to the cylinders coupled to said longitudinal shaft.

In testimony whereof I have signed this specification.

FRANCIS A. JIMERSON.